United States Patent [19]

Stephan et al.

[11] Patent Number: 5,878,163
[45] Date of Patent: *Mar. 2, 1999

[54] LIKELIHOOD-BASED THRESHOLD SELECTION FOR IMAGING TARGET TRACKERS

[75] Inventors: Larisa A. Stephan, Hawthorne; Gillian K. Groves, Torrance, both of Calif.

[73] Assignee: Raytheon Company, El Segundo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 540,638

[22] Filed: Oct. 11, 1995

[51] Int. Cl.$^6$ .......................................... G06K 9/46
[52] U.S. Cl. ............................. 382/172; 382/270
[58] Field of Search ................... 382/171, 172, 382/173, 180, 103, 168, 264, 270; 358/464, 465, 466

[56] References Cited

U.S. PATENT DOCUMENTS

| | | | |
|---|---|---|---|
| 4,364,089 | 12/1982 | Woolfson | 348/169 |
| 4,958,224 | 9/1990 | Lepore et al. | 358/126 |
| 5,138,671 | 8/1992 | Yokoyama | 382/272 |
| 5,341,142 | 8/1994 | Reis et al. | 342/64 |
| 5,444,556 | 8/1995 | Ito et al. | 358/501 |

FOREIGN PATENT DOCUMENTS 0 423 984  4/1991  European Pat. Off. .

OTHER PUBLICATIONS

C. J. Samwell and G. A. Cain, "The Bae (Bracknell) Automatic Detection, Tracking and Classification Systems", in Conf. Proc. Advances In Guidance And Control Systems and Technology, London, 7–10 Oct. 1986, pp. 17/1–10.

*Primary Examiner*—Yon J. Couso
*Attorney, Agent, or Firm*—Colin M. Raufer; Leonard A. Alkov; Glenn H. Lenzen, Jr.

[57] ABSTRACT

An imaging target tracker and a method for determining thresholds that are used to optimally distinguish a target from background. The present invention is an imaging target tracker that comprises a likelihood-based threshold selection method that uses knowledge of the location of a target to build up temporally-smoothed grey-level distribution or likelihood maps. Inner and outer histograms are formed that comprise inner and outer regions of an image, respectively, using inner, buffer and outer gates that segment the image. The inner and outer histograms are then recursively smoothed. A lookup table of actually observed pixel values is formed. A target likelihood value for actually observed pixel values is then computed. Legal start and end points of histogram segments are identified. Valid histogram segments are identified. The longest histogram segment is identified. Finally, two optimal thresholds are selected 8 and are set at respective ends of histogram segments. The likelihood maps adapt over time to the signature of the target. The grey-level distribution of the target is used to select thresholds that pass a band of grey levels whose likelihood that they belong to the target is high.

6 Claims, 9 Drawing Sheets

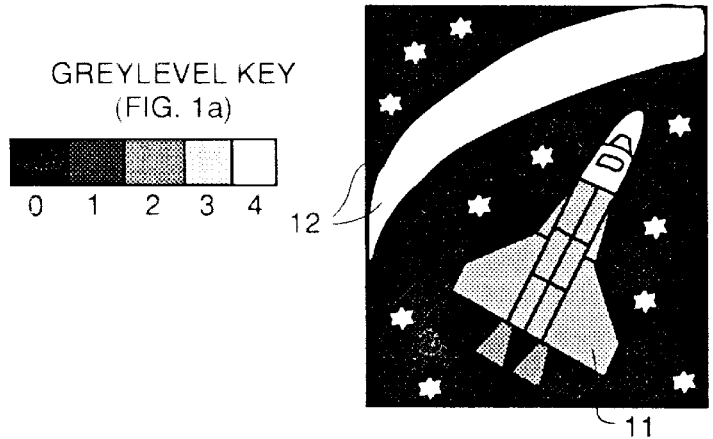
FIG. 1a
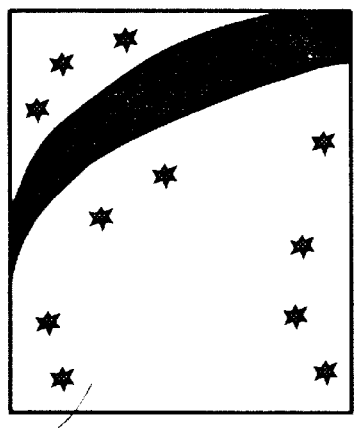
FIG. 1b
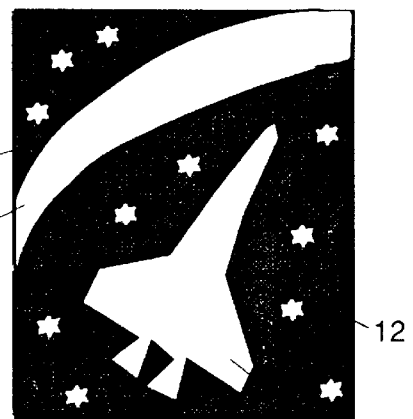
FIG. 1c
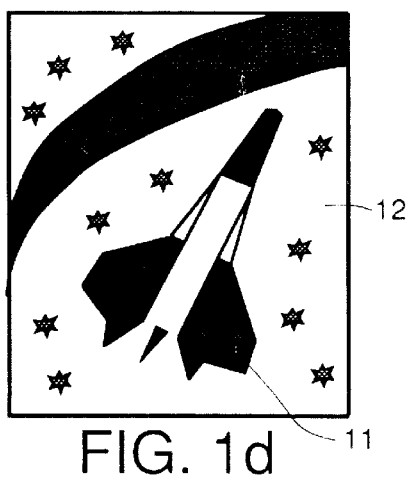
FIG. 1d
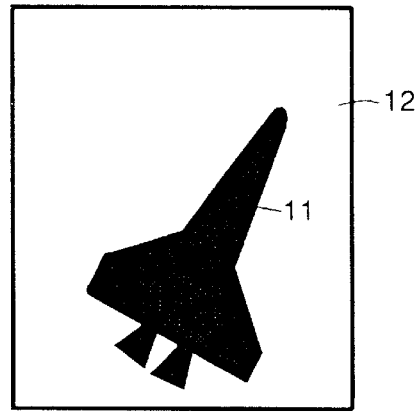
FIG. 1e
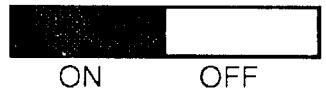

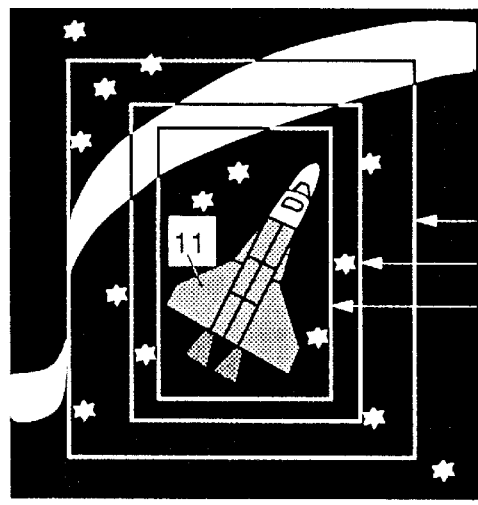
FIG. 3
RAW OUTER HISTOGRAM $H_r^0$ $\Delta-1$
FIG. 4d
FIG. 4a
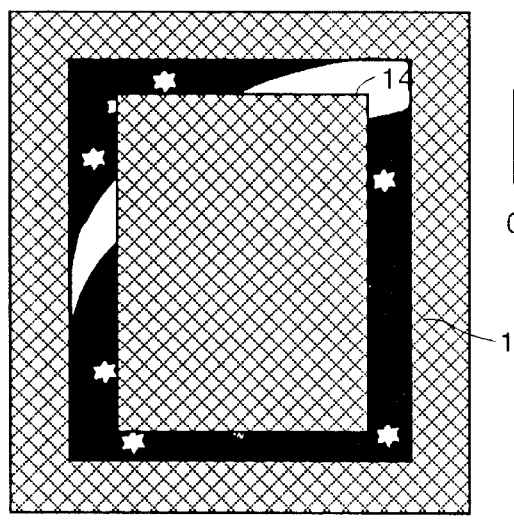
FIG. 4c
FIG. 4b
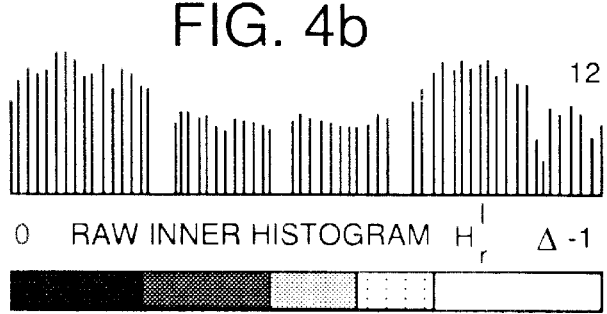
RAW INNER HISTOGRAM $H_r^I$ $\Delta-1$
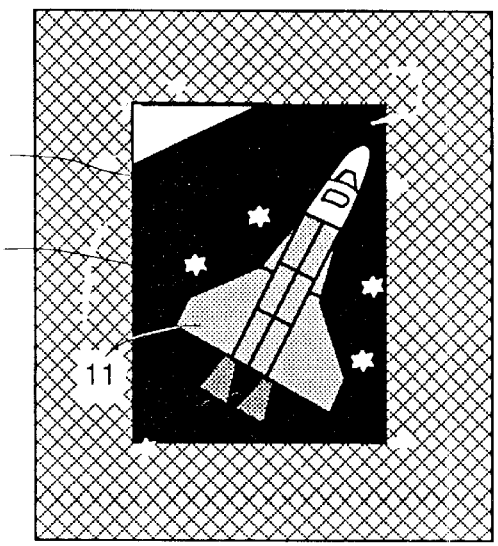

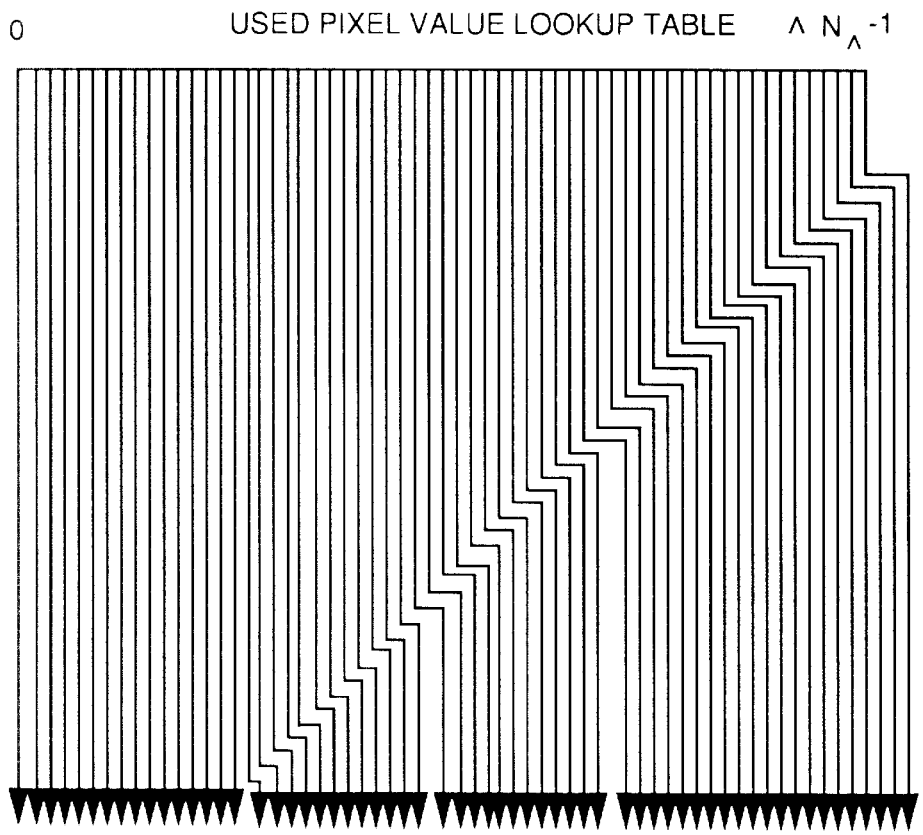
FIG. 5a
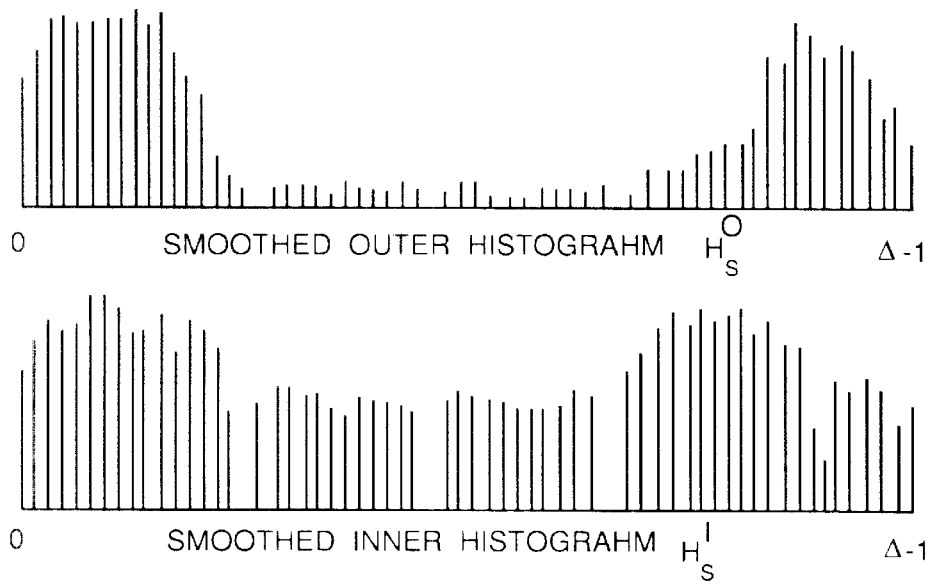
FIG. 5b
FIG. 5c

0   SMOOTHED OUTER HISTOGRAHM   $H_S^O(\wedge)N_\wedge -1$

0   SMOOTHED INNER HISTOGRAHM   $H_S^I(\wedge)N_\wedge -1$

0   TARGET LIKELIHOOD MAP L   $N_\wedge -1$ $m_s$

LIKELIHOOD-BASED THRESHOLD SELECTION FOR IMAGING TARGET TRACKERS

BACKGROUND OF THE INVENTION

The present invention relates to imaging target trackers, and more particularly, to a likelihood-based threshold selection method and imaging target tracker using same.

Many gated imaging target trackers use thresholding to distinguish target regions from background areas in the input imagery. The thresholding operation and calculation of geometric moments from the resulting binary image are computationally inexpensive enough to be performed every cycle, allowing the estimate of target position to be updated very frequently.

A typical centroid tracker might employ a threshold in concert with a polarity indicator to separate from the remainder of the image the bright or dark pixels that belong to the target. Extensions of this technique include the use of multiple thresholds, with the target pixels being those whose grey levels fall between or outside the bands specified by the threshold values.

Most threshold selection algorithms find thresholds that are optimal according to specific regional or global statistics. These traditional approaches do not involve any model of the target except that it is expected to be separable from the background by a threshold suite. Thus they fail to make use of the most important unique feature of imaging target trackers: the well-known location of the target in each frame.

The shortcomings of prior art are that most threshold selection algorithms described in the literature are not concerned with segmentation of the image into target and background components. Instead, most are designed to optimize some global statistic, such as entropy, edge prevalence, or visual appearance, for example. Such methods are described by T. Pun, "Entropic Thresholding: A New Approach," Computer Vision, Graphics and Image Processing Vol. 16, pp. 210–239, 1981, R. Kohler, "A Segmentation System Based on Thresholding," Computer Graphics and Image Processing Vol. 15, pp. 319–338, 1981, and R. Whatmough, "Automatic Threshold Selection from a Histogram Using the 'Exponential Hull," CVGIP: Graphical Models and Image Processing Vol. 53, p. 592–600, 1991, respectively. For instance, an approach that attempts to maximize information content might result in a threshold pair like that in FIG. 1(d), yielding a silhouette in which the true target pixels are split between the foreground and background of the resulting binary image. Methods of this nature are not suited for use with centroid trackers that expect the silhouette image to contain only target pixels in its foreground.

Threshold selection algorithms used in most imaging target trackers benefit from knowledge of the target position, and can therefore use metrics of threshold quality that favor extraction of foreground pixels only within the track gate. Additionally, since thresholding occurs only in the region immediately surrounding the track gate, behavior of the thresholds over the remainder of the image does not affect track measurement accuracy.

Despite these advantages, traditional methods of selecting thresholds for imaging trackers have not taken advantage of the fact that the object to be segmented is the same in each frame over time. Standard approaches typically look at each frame separately, using temporal continuity only to prevent the thresholds from changing too rapidly. The traditional methods often assume that the target contrasts with the background at one or the other end of the grey scale dynamic range, and that it maintains this polarity throughout the life of the track. Such approaches are described in U.S. Pat. No, 4,849,906, issued to Chodos et al. and U.S. Pat. No. 4,719, 584 issued to Rue et al., for example. These approaches cannot find thresholds to segment out a target if it is neither uniformly brighter nor darker than its background. Furthermore, even if the target was tracked in a dark area of the background where the target contrasts positively against the background, if the target subsequently moved over a bright portion of the background, the positive contrast assumption would be incorrect and loss of lock would likely result.

Therefore, it is an objective of the present invention to provide for an improved threshold selection method and imaging target tracker using same.

SUMMARY OF THE INVENTION

In order to meet the above and other objectives, the present invention is an improved imaging target tracker that employs an improved likelihood-based threshold selection method that uses knowledge of the location of a target to build up temporally-smoothed grey-level distribution maps, or likelihood maps. The imaging target tracker is a fully-programmable dual mode autotracker that is comprised of a video processor and a microcomputer. The video processor includes a video preprocessor, a correlation processor and a centroid processor.

Pixel-rate processing is performed in the video processor, and video frame-rate mode control functions such as centroid threshold, track gate sizes, and track mode selection, for example, are performed in software in the microcomputer. The video processor selectably uses one of three composite analog video channels or a digital video channel as its input. For the analog input channels, the selected video signal is passed through a local area gain/offset circuit in the video preprocessor and digitized. The input digital video signal is processed by centroid and correlation track error circuits in the correlation and centroid processors and raw error data is provided to the microcomputer. The video processor also generates an instrumentation video output with track gate, reticle, and system symbology, and the like.

The threshold selection method is implemented in the microprocessor of the tracker, and two thresholds are extracted from the maps that separate grey-levels from the background with a high probability that the grey-levels belong to the target that is tracked. The method selects thresholds by using repeated samples of the target region and a background region to build likelihood maps that adapt over time to the target signature. The method uses the grey-level distribution of the target to select thresholds that pass a band of grey levels whose likelihood that they belong to the target is high.

The present method determines thresholds that are used to optimally distinguish a target from background and comprises the following steps. Inner and outer histograms are formed comprising inner and outer regions of an image, respectively, using inner, buffer and outer gates that segment the image. The inner and outer histograms are recursively smoothed. A lookup table of actually observed pixel values is formed. A target likelihood value for actually observed pixel values is computed. Legal start and end points of histogram segments are identified. Valid histogram segments are identified. The longest histogram segment is identified. Finally, two optimal thresholds are selected and are set at respective ends of histogram segments.

The present method enhances track fidelity by imaging target trackers in which it is employed. By selecting thresholds that pass more of the target and less of the background, the method improves target position measurement. The method models bimodal targets and allows a pair of thresholds to distinguish from the background targets that have positive contrast, negative contrast, both, or a range of grey levels not represented in the background. The present invention may be incorporated into any imaging target tracker that measures target position as the centroid of a thresholded grey-level image.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIGS. 1a–1e illustrate sample thresholded images useful in explaining centroid tracking methods;

FIG. 3 shows a sample image and gates used for the present threshold selection method;

FIGS. 4a–4d show formation of raw inner and outer histograms;

FIG. 5a–5c shows a lookup table in accordance with the principles of the present invention;

DESCRIPTION OF THE PREFERRED EMBODIMENTS

Figure 2:
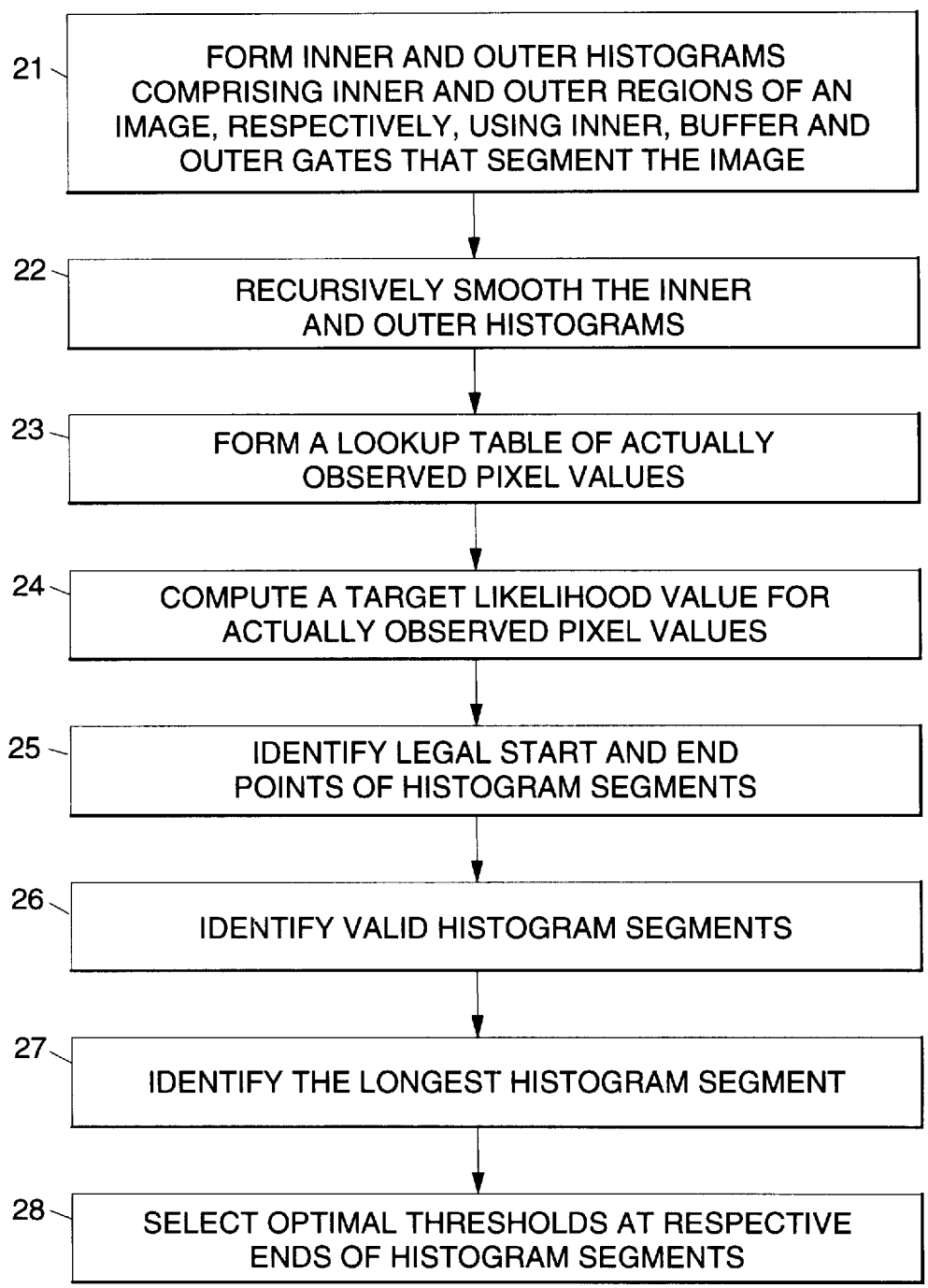
FIG. 2 is a flow chart of a threshold selection method in accordance with the principles of the present invention.

Referring to the drawing figures, and by way of introduction, FIGS. 1a–1e illustrate sample thresholded images useful in explaining centroid tracking methods, including the present invention. A conventional gated centroid tracker might produce one of the binary "silhouette" images shown in FIGS. 1b–1e derived from the image in FIG. 1a, depending on the values of the threshold(s). FIGS. 1b–1d show poor separation of a target 11 from the background 12 because a single threshold cannot segment a moderately bright target 11 away from a background 12 comprised of light and dark regions. FIG. 1e is an example of good target 11 and background 12 separation achieved by a pair of thresholds in concert.

It is not necessary that the thresholds segment every target pixel, but it is important that they minimize the number of background pixels segmented as the target 11. The percentage of the target 11 that forms a silhouette is a significant secondary consideration in discriminating among competing approaches to threshold selection because the tracker's position prediction loses precision when using only a partial estimate of the target 11. For example, if the image of FIG. 1a is thresholded above 1 and below 4, the target 11 would still be large and detailed enough for position measurement, although it would lack its rocket engine nozzles. In contrast, a target position measurement based upon the "on" pixels of the silhouette in FIG. 1d would be drastically perturbed from the target's true centroid.

The approaches are described in U.S. Pat. No. 4,849,906 and U.S. Pat. No. 4,719,584 issued to Rue et al. and would be unable to find any thresholds at all to segment out the target 11 in FIG. 1, since it is neither uniformly brighter nor darker than its background 12. Furthermore, even if the target 11 in FIG. 1a was tracked in a dark area of the background 12 where the target contrasts positively against the background 12, if the target 11 subsequently moved over a bright portion of the background 12, the positive contrast assumption would be incorrect and loss of lock would likely result.

In order to overcome the problems with conventional threshold selection approaches, the present invention is a threshold selection method 10 that uses knowledge of the location of a target 11 to build up temporally-smoothed grey-level distribution maps, or likelihood maps. Two thresholds are extracted from the constructed maps that separate the grey-levels from the background 12 with a high probability that the grey-levels belong to the target 11 that is tracked. The method 10 selects thresholds by using repeated samples of regions including the target 11 and background 12 to build likelihood maps that adapt over time to the target signature. The method 10 uses the grey-level distribution of the target 11 to select thresholds that pass a band of grey levels whose likelihood that they belong to the target 11 is high.

FIG. 2 is a flow chart illustrating the threshold selection method 10 in accordance with the principles of the present invention. The method 10 uses the grey-level distributions of the target 11 and background 12 over time to select two thresholds that separate pixels with a high likelihood that they belong to the target 11 from those with low or no likelihood that they belong to the target 11. The steady state solution (used when the target 11 has been successfully acquired) will first be described, and the initialization procedures will be described thereafter.

With regard to the steady state solution, the threshold selection method 10 is a likelihood-based dual threshold selection method 10 that comprises the following steps. Inner and outer histograms comprising inner and outer regions of an image, respectively, are formed, illustrated by step 21. The inner and outer histograms are formed by using inner, buffer and outer gates 13, 14, 15 that segment the image. In the second step, the inner and outer histograms are recursively smoothed, illustrated by step 22. A lookup table of actually observed pixel values is formed, illustrated by step 23. A target likelihood value for actually observed pixel values is computed, illustrated by step 24. Legal start and end points of histogram segments are identified, illustrated by step 25. Valid histogram segments are identified, illustrated by step 26. The longest histogram segment is identified, illustrated by step 27. Two optimal thresholds are selected and are set at respective ends of histogram segments, illustrated by step 28.

Determination of the optimal thresholds uses histogram analysis only, which is important to minimize the number operations that are performed in a real-time imaging target tracker. Pairs of thresholds eligible for selection must delimit a segment of pixel values whose average likelihood that they belong to the target 11 is above a predetermined minimum value. The optimal threshold pair delimits the longest such segment.

To illustrate the operation of the method 10, reference is again made to the FIG. 1a, however, it is now assumed that the grey-scale dynamic range is A=64 rather than A=5. FIG. 3 shows the original image superimposed with inner, buffer and outer gates 13, 14, 15 used to implement the method 10. The inner gate 13 is assumed to be positioned by the tracker such that it best estimates the exact spatial extent of the target 11 and therefore contains all pixels that are known to belong to the target 11. The buffer gate 14, located a few pixels outside the inner gate 13, provides an error margin between the inner and outer gates 13, 15 such that the annulus between the buffer gate 14 and outer gate 15 is assumed to contain only background pixels.

FIG. 4 shows the inner region (within the inner gate 13) and the outer region (between the buffer and outer gates 14. 15). The total pixel counts in each of these regions constitute areas, $A_I$ and $A_O$, comprising the inner and outer regions, respectively. A nominal region area, $A_n$, is a system parameter. In the first step 21, counts of pixels at each of the grey levels found in the inner and outer regions 13, 15 are scaled by $A_n/A_I$ and $A_n/A_O$ respectively, to form a raw inner and outer histogram $H_I^I$, $H_I^O$. Scaling of histogram bins at creation ensures that relative proportions of grey level pixel value counts persist over time despite potential changes in track gate size.

Recursively smoothing 22 the raw inner and outer histograms to produce smoothed inner and outer histograms may be achieved using an alpha filter. Thus, for each pixel value $i \in \{0 \ldots \Delta-1\}$, a new smoothed inner (outer) histogram bin value is:

$$H_S(i) = (1-\alpha)H_S(i) + \alpha H_r(i) \quad (1)$$

where $H_S = H_S^I$ and $H_r = H_r^I$, or $H_S = H_S^O$ and $H_r = H_r^O$ respectively. If $\alpha$ has not yet reached its steady state value, it decays toward that value after use in the histogram smoothing operation of Equation (1).

The lookup table of pixel values $\Lambda: \{0 \ldots \Delta-1\} \to \{0 \ldots \Delta-1\}$ is created 23 that has non-zero values in either the inner or outer smoothed histograms. The lookup table, illustrated in FIG. 5, is constructed to meet two criteria:

$$H_S^I(i) + H_S^O(i) > 0 \text{ iff } \exists j \Lambda(j) = i, \text{ and } \Lambda(j) < \Lambda(j+1) \forall j. \quad (2)$$

Accessing the smoothed histograms using the lookup, table therefore limits searches to those pixel values that have actually been observed. Such pixel values are referred to as "used" pixel values and the number of them (the length of the lookup table) is $N_\Lambda$. That is, enumerating the values $\Lambda(0) \ldots \Lambda(N_\Lambda-1)$ cycles through the bin numbers of all original input pixel values that have occurred in one of the input images.

For purposes of searching the lookup table, it is convenient to extend the map $\Lambda$ to $\Lambda': Z \to \{0 \ldots \Lambda-1\}$ by defining:

$$\Lambda'(j) = \Lambda(J) \forall j \in \{0 \ldots N_\Lambda\}, \text{ and } \Lambda'(j) = \Lambda'(j+N_\Lambda) \forall j \in Z. \quad (3)$$

$\Lambda'$ defines a successor and predecessor of each bin that the lookup table references, and in particular, it defines $\Lambda(0)$ to be the successor of $\Lambda(N_\Lambda=1)$.

The likelihood of each used pixel value belonging to the target 11, or target signature, is then computed 24. The likelihood L(j) of a lookup table pixel value j belonging to the target 11 is defined by the ratio of occurrences of that pixel value in the inner region to its total occurrences in inner and outer regions. This Bayesian likelihood ratio may be written as:

$$L(j) = \frac{H_S^I(\Lambda(j))}{H_S^I(\Lambda(j)) + H_S^O(\Lambda(j))} \quad (4)$$

The first condition on the definition of $\Lambda$ ensures that L(j) is defined for all $j \in \{0 \ldots N_\Lambda\}$. An extended map L' based on $\Lambda'$ may also be similarly defined.

The fifth through seventh steps 25–27 identify segments of the lookup table $\Lambda$ that have average target likelihood values above a predetermined value of at least $m_a$ (a system parameter). The threshold pair that is eventually selected is the one that delimits the longest such segment.

Lookup table pixel values that are legal segment start points must have target likelihood values of at least $m_s$ and must be located at an ascending 3-bin region of the likelihood map. Lookup table pixel values that are legal segment end points must have target likelihood values of at least $m_s$ and must be located at an descending 3-bin region of the likelihood map. Alternatively, the conditions for legal start points may be stated as $$L(j) \geq M_s \text{ and } L'(j-1) < L'(j) \leq L'(j+1) \text{ or} L'(j-1) \leq L'(j) < L'(j+1) \quad (5)$$

Figure 6A:
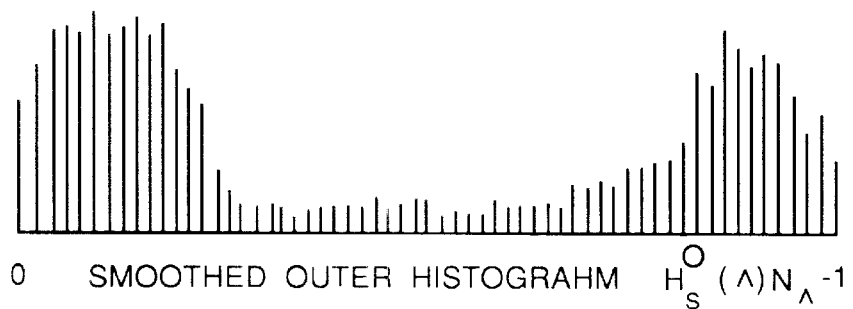
FIG. 6a–6c shows legal segment start and end point configurations.
Figure 6B:
Figure 6C:
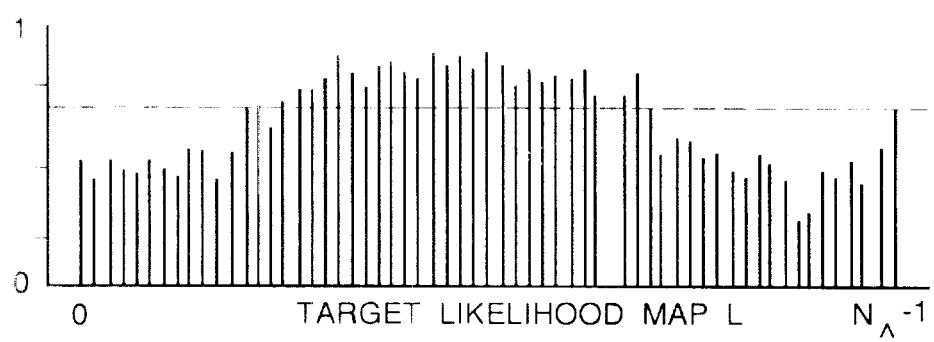
Figure 7A:
FIG. 7a–7d shows an example legal likelihood segments.
Figure 7B:
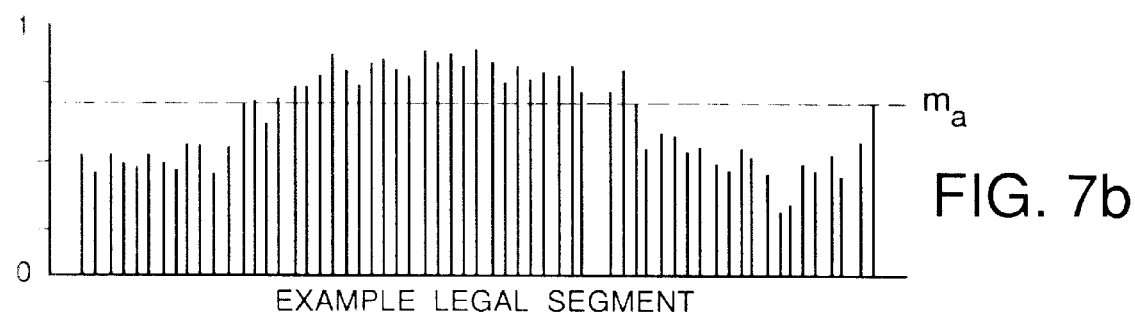
Figure 7C:
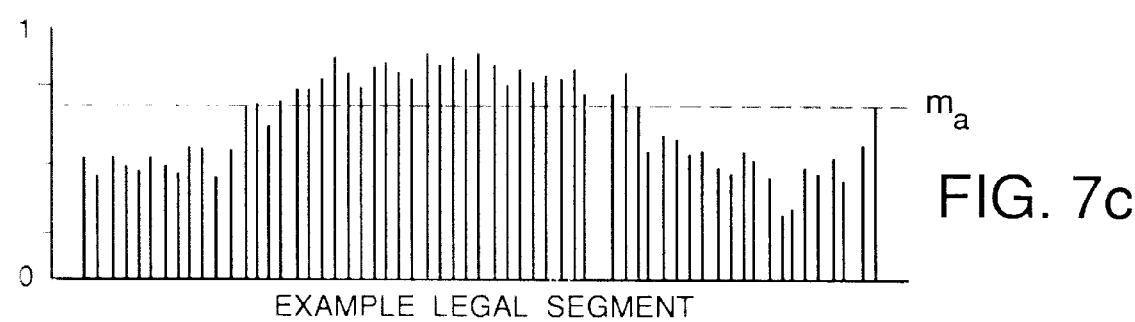
Figure 7D:
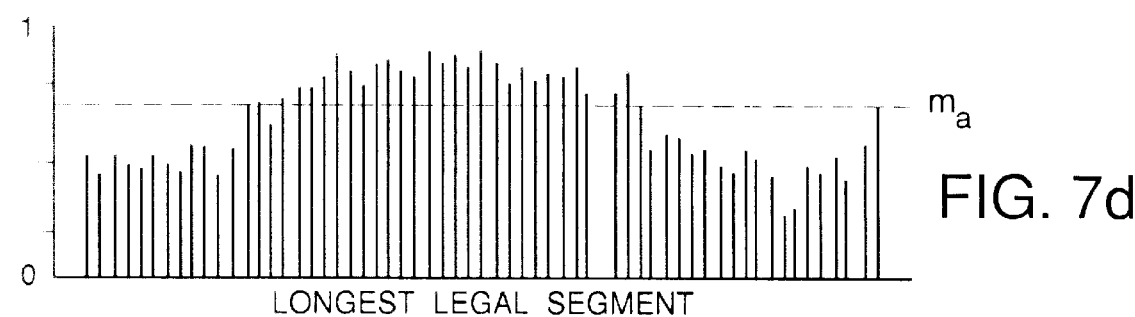

This latter condition, depicted in FIG. 6, ensures that segments are excluded whose average likelihood would be raised by outward movement of the end points; and these will always be subsets of the processed segments. It also prevents any point from being both a legal start point and a legal end point.

Valid histogram-segments are then identified 26. A legal segment of the likelihood map begins with a legal start point, ends with a legal end point, and has an average target likelihood of at least $m_a$. Because of the extended definition of L', the original image pixel value represented by the start point of a segment may be greater than the pixel value represented by the end point of the segment. Example legal likelihood segments are shown in FIG. 7.

The optimal threshold pair is selected 27, and is the pair whose lookup table values delimit the longest legal likelihood map segment. Any search technique may be used to find the longest segment, which is shown at the lower right portion of FIG. 7. This results in an ordered pair $(j_1, j_2)$ of indices to the likelihood map, where $j_1$ is the starting index (a legal start point) and $j_2$ is the ending index (a legal end point).

Two optimal thresholds, at respective ends of histogram segments are then selected 28. By isolating the lookup table values that delimit the longest likelihood map segment, the lookup table is inverted to find the original image pixel values that generated those likelihood values. The final optimal threshold pair is then defined as $$(i_1, i_2) = (\Lambda(j_1), \Lambda(j_2)). \quad (6)$$

Figure 8B:
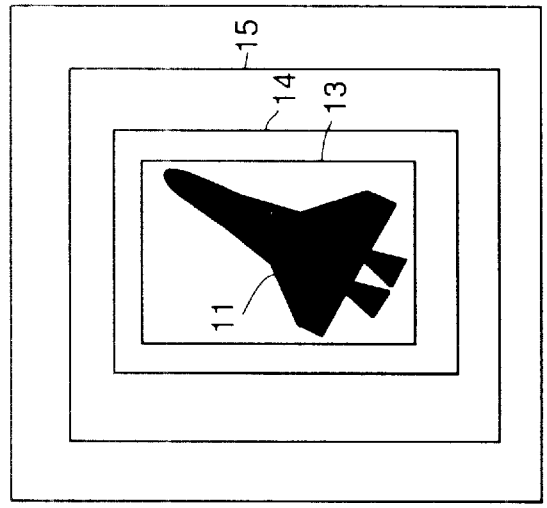
FIG. 8a–8c shows positions of thresholds on a raw inner histogram and the resulting silhouette for an image processed by the present invention.
Figure 8C:
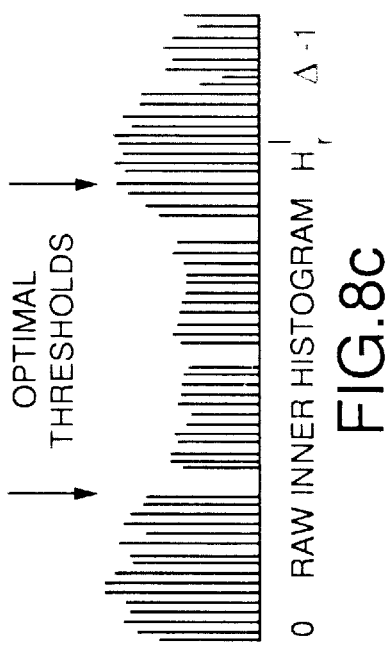
Figure 8A:
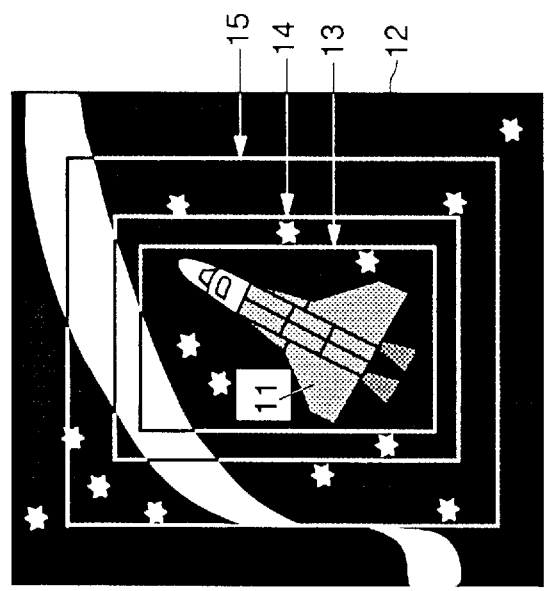

If $i_1 < i_2$, the original image pixel values segmented as target pixels are those in the range $\{i_1 \ldots i_2\}$ and the method 10 is referred to as "internal"; otherwise the target pixels are those with grey levels in the set $\{i_1 \ldots \Delta-1\} \cup \{0 \ldots i_2\}$ and the method 10 is referred to as "external". The positions of these thresholds on the raw inner histogram and the resulting silhouette for an image processed by the method 10 are shown in FIG. 8.

The traditional concept of positive/negative contrast employed with a single threshold is a special case of the "internal" dual thresholding method 10. Positive contrast single thresholding may be emulated by setting $0 \leq i_1 < i_2 = \Delta$ and negative contrast single thresholding may be emulated by setting $0 = i_1 < i_2 < \Delta$.

The initial conditions for the threshold selection method 10 are that all smoothed histogram bins are identically zero, and α=1.

Tests were performed using the likelihood-based dual threshold selection method 10 described above, which was compared against a baseline single threshold selection method on a sequence of infrared images. The targets 11 were a tank, traveling from right to left in the image, and two cars, traveling from left to right in the image. During the sequence, the cars each pass in front of the tank. Each target 11 was tracked individually and was acquired before any other vehicle impinged on the track gate (inner gate 14) or border gate (outer gate 15) of the primary target 11.

The two methods were compared in categories of sequence completion without loss of lock, average number of target pixels segmented with the automatically selected thresholds, and counts of track quality values (good/fair/poor). Results of this test are summarized in Table 1. From this information, the thresholding method 10 provides superior performance in the presence of clutter items or other targets that have the same grey level polarity as the target under track.

| Method | Target | Finished? | Avg. # Pixels | # Good | # Fair | # Poor |
|---|---|---|---|---|---|---|
| Baseline | Tank | No | 34.8 | 126 | 42 | 16 |
| Likelihood | Tank | Yes | 344.7 | 143 | 41 | 0 |
| Baseline | Car | No | 52.4 | 131 | 37 | 16 |
| Likelihood | Car | Yes | 104.7 | 134 | 42 | 8 |

Figure 9:
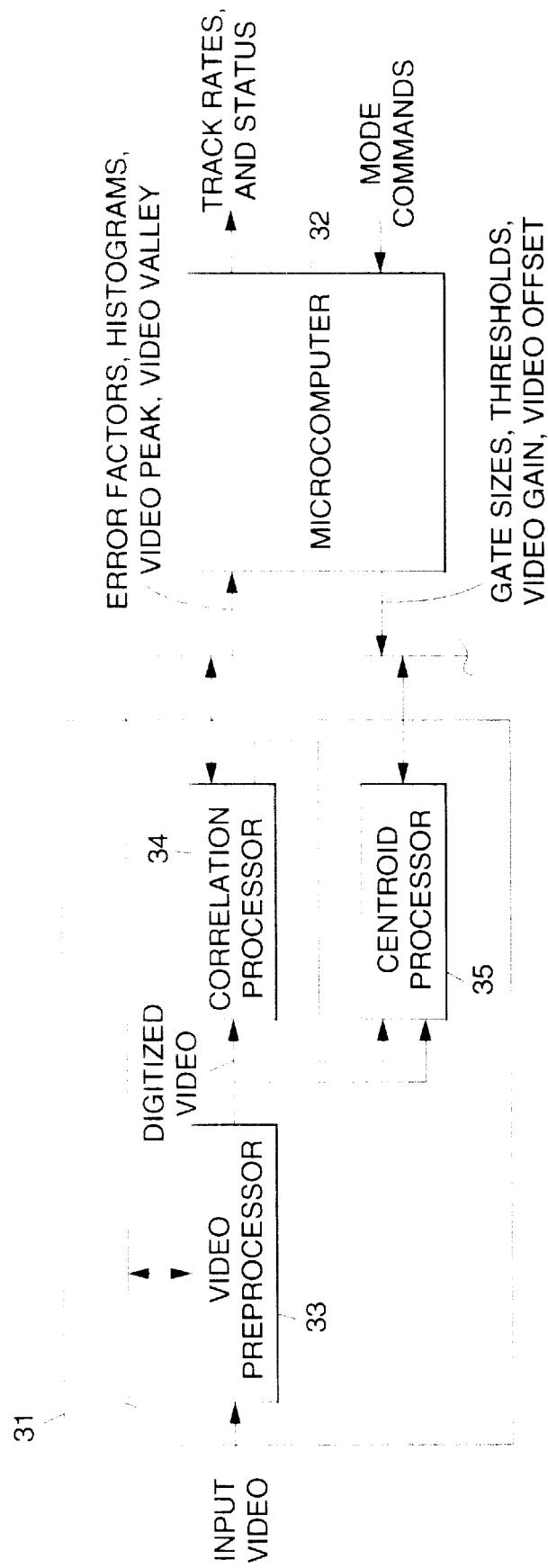
FIG. 9 illustrates a functional block diagram of a fully-programmable dual mode autotracker employing the threshold selection method.

FIG. 9 illustrates a functional block diagram of an imaging target tracker 30 comprising a dual mode autotracker 30 that employs the above-described threshold selection method 10. The imaging target tracker 30, or fully-programmable dual mode autotracker 30, is comprised of a video processor 31 and a microcomputer 32. The video processor 31 includes a video preprocessor 33, a correlation processor 34, and a centroid processor 35. The video processor 31 processes input video signals and couples its output to the correlation and centroid processors 34, 35. The output of the correlation processor 34 (reference and difference video signals), is coupled to the centroid processor 35. The video processor 31 outputs error factors, histograms, video peak and video valley signals to the microcomputer 31. The microcomputer 31 outputs gate sizes, thresholds, video gain and video offset signals to the video processor 31. The microcomputer 31 also receives mode commands as inputs and outputs track rates and status signals. The above-described threshold selection method 10 is performed in the correlation and centroid processors 34, 35. A more detailed description of the basic design and operation of the dual mode autotracker 30 may be found in U.S. Pat. No. 4,849,906 entitled "Dual Mode video Tracker" assigned to the assignee of the present invention, the contents of which are incorporated herein by reference. The present dual mode tracker 30 is different from the specific implementation described in U.S. Pat. No. 4,849,906 in that it is fully programmable, and also implements the likelihood-based dual threshold selection method 10 described above.

Pixel-rate processing is performed in the video processor 31, and video frame-rate mode control functions such as centroid threshold, track gate sizes, and track mode selection, are performed in software in the microcomputer 32. The video processor 31 selectably uses one of three composite analog video channels or a digital video channel as its input. For the analog input channels, the selected video signal is passed through a local area gain/offset circuit (not shown) that is part of the video preprocessor 31 and digitized. The input digital video signal is processed the correlation and centroid processors 34, 35 and raw error data is provided to the microcomputer 32. The video processor 31 also generates an instrumentation video output with track gate, reticle, and system symbology, and the like.

Figure 10:
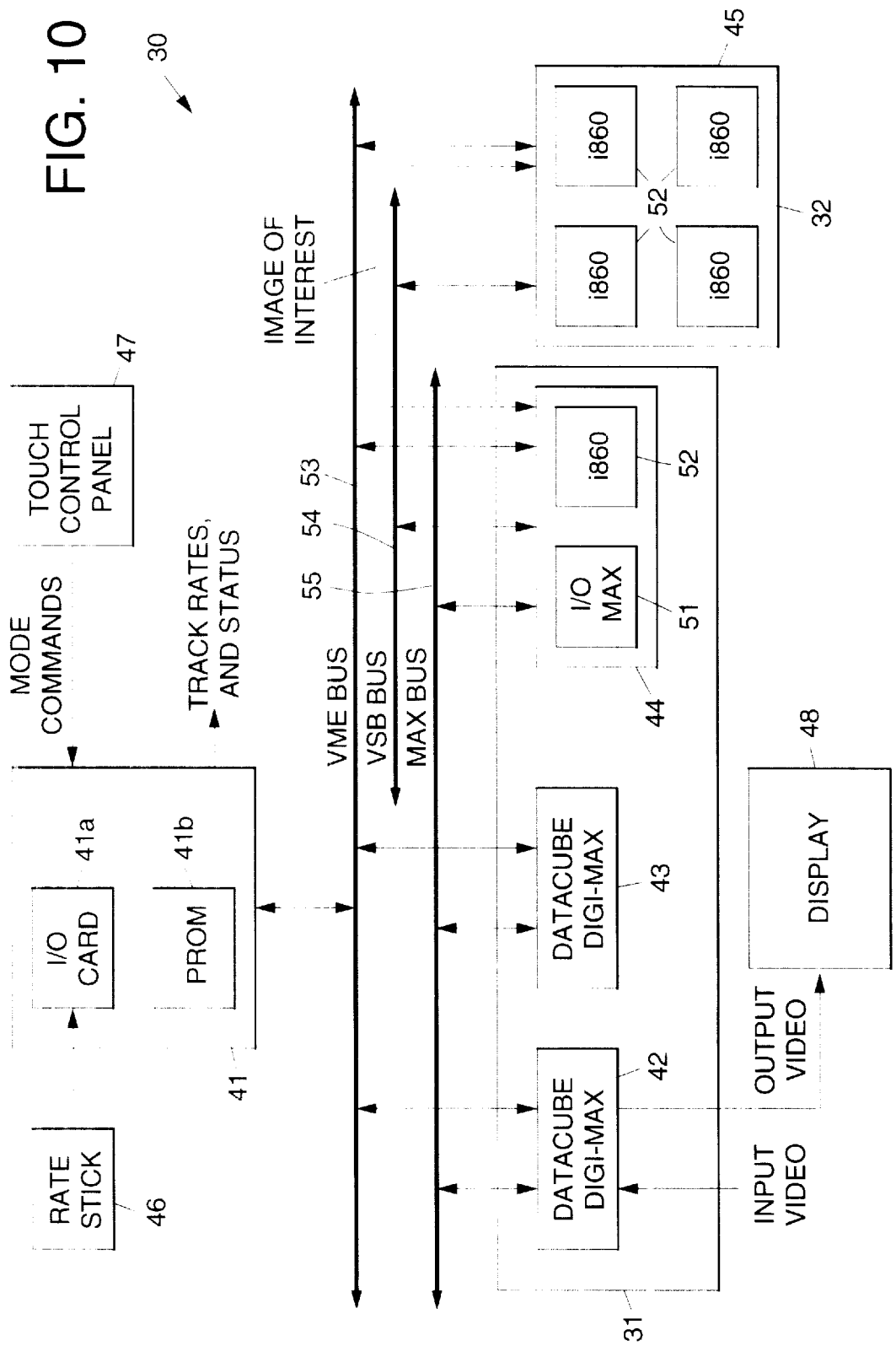
FIG. 10 illustrates a functional block diagram of a fully-programmable dual mode autotracker that has been reduced to practice.

FIG. 10 illustrates a functional block diagram of a fully-programmable dual mode autotracker 30 that has been reduced to practice and that implements the dual mode autotracker 30 shown in the functional block diagram of FIG. 9. This implementation of the dual mode autotracker 30 is a VME-based system that uses off-the-shelf commercially available components. The dual mode autotracker 30 uses five circuit cards including a host computer 41 (Motorola 68040-based processor), image capture and display cards 42,43 (DataCube Digi-Max and image memory cards 42, 43), and two floating point array processor cards 44, 45 (Mercury VB and VS cards 44, 45). These components are interconnected and data flows therebetween by way of a VME bus 53, a VSB bus 54, and a MAX bus 55. The interconnection and operation of these components are well-understood by those skilled in the art.

The 68040-based host computer 41 serves as a system controller and includes a conventional input/output (I/O) card 41a that interfaces to a user-controlled rate stick 46 and programmable read only memory (PROM) 41b. Host inputs include mode commands and rate stick inputs derived from the rate stick 46. Mode commands are entered by a user using a touch control panel 47. Depending upon the selected mode, initial target selection is accomplished using the autotracker 30, or by the user using the rate stick 46. Outputs from the host computer 41 include the track rates and status, and the output format is either RS-232 or RS-422.

The dual mode autotracker 30 accepts either analog RS-170 or RS-330 or digital input video. Analog input video is digitized by the image capture and display card 42 (Digi-Max card 42) and transferred to the image memory card 43 and floating point processor 44 (Mercury VB). Track processing in accordance with the above-described threshold selection method 10 is implemented in the floating point processor 44 and second array processor 45. Upon completion of track processing, the host computer 41 generates commands for track gate, reticle and system symbology. This symbology is generated by the image memory card 43. The original input video and graphics overlay are then displayed on a display 48.

For maximum speed and flexibility, an track processing is performed in software by five i860 processors 52 contained in the floating point array processor cards 44, 45 (Mercury VB and VS cards 44, 45). The single-processor floating point array processor card 44 (Mercury VB card 44) receives an input frame by way of an input/output card 51 (I/O MAX 51) and converts integer pixels to floating point pixels. The data is then transferred to a quadruple processor floating point array processor card 45 (Mercury VS card) for track processing. Upon completion, the results are transferred to the host computer 41 which outputs track rates, and status, and the like.

Thus there has been described a new and improved dual mode autotracker, and likelihood-based dual threshold selection method for use in imaging target trackers. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A threshold selection method for use in imaging target trackers that determines thresholds that are used to optimally distinguish a target from background, said method comprising the steps of:

forming inner and outer histograms comprising inner and outer regions of an image, respectively, using an inner gate, a buffer gate and an outer gate that segment the image into histogram segments;

recursively smoothing the inner and outer histograms;

forming a lookup table of observed pixel values;

computing a target likelihood value for observed pixel values;

identifying legal start and end points of the recursively smoothed histogram segments;

identifying valid recursively smoothed histogram segments;

identifying the longest recursively smoothed histogram segment; and selecting optimal thresholds at respective ends of the recursively smoothed histogram segments.

2. The method of claim 1 wherein the step of forming inner and outer histograms comprises the steps of:

counting the number of pixels at each of the grey levels found in the inner and outer region; and scaling the counted pixels to form a raw inner and outer histograms.

3. The method of claim 1 wherein the step of recursively smoothing the inner and outer histograms comprises the step of:

recursively smoothing the raw inner and outer histogram using an alpha filter to produce smoothed inner and outer histograms.

4. An imaging target tracker comprising:

a video processor comprising:

a video preprocessor for receiving input video signals and for providing digitized video output signals comprising a target and background;

a correlation processor coupled to the video preprocessor for processing the digitized video output signals and for computing reference and difference video signals that are indicative of the target and the background; and a centroid processor coupled to the video preprocessor and to the correlation processor for processing the digitized video output signals and the reference and difference video signals, and for computing centroid signals indicative of the centroid of the target; and a microcomputer coupled to the video preprocessor, the correlation processor, and the centroid processor for processing the reference and difference video signals and the centroid signals and wherein the microcomputer comprises a threshold selection method for processing recursively smoothed grey-level distributions of the target to select thresholds whose likelihood of belonging to the target region is high, which thresholds are used to optimally distinguish the target from the background.

5. The imaging target tracker 30 of claim 4 wherein the method implemented in the microcomputer 32 selects thresholds by using repeated samples of a target region and a background region to build likelihood maps that adapt over time to a signature of the target.

6. The imaging target tracker of claim 4 wherein the method implemented in the microcomputer comprises the following steps:

forming inner and outer histograms that comprise inner and outer regions of an image, respectively, using an inner gate, a buffer gate and an outer gate that segment the image into histogram segments;

recursively smoothing the inner and outer histograms;

forming a lookup table of observed pixel values;

computing target likelihood values for observed pixel values;

identifying legal start and end points of the recursively smoothed histogram segments.

identifying valid recursively smoothed histogram segments;

identifying the longest recursively smoothed histogram segment; and selecting two optimal thresholds and setting them at respective ends of the recursively smoothed histogram segments.

* * * * *